Nov. 18, 1958 A. A. MEYER 2,860,403
METHOD OF MAKING A POLE PIECE UNIT FOR MAGNETS
Filed June 30, 1953
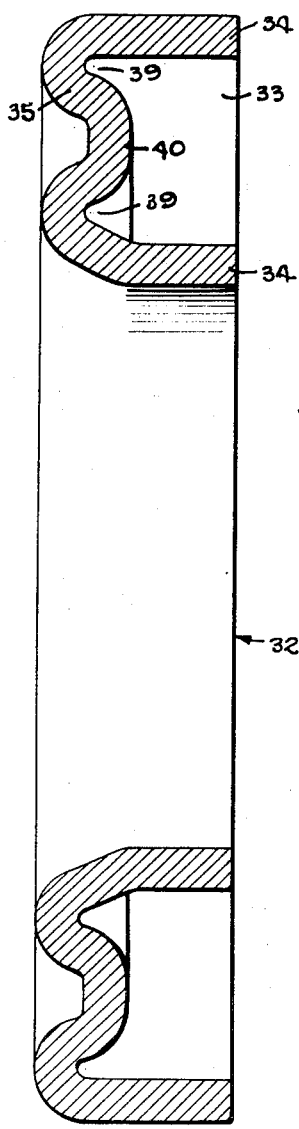
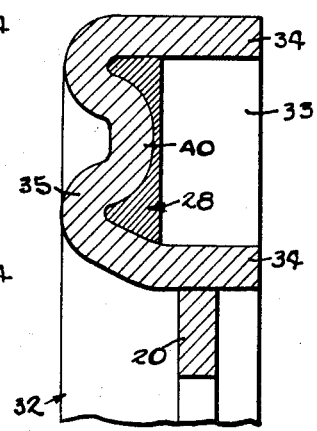
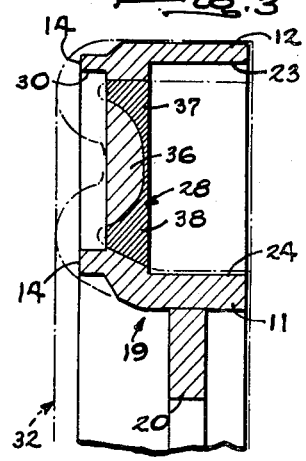
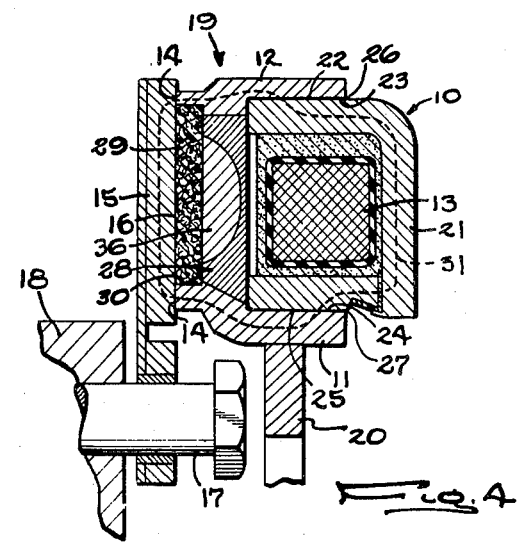
INVENTOR
Arthur A. Meyer
By Carlson, Pitzner, Hubbard & Wolfe
ATTORNEY

2,860,403

METHOD OF MAKING A POLE PIECE UNIT FOR MAGNETS

Arthur A. Meyer, Beloit, Wis., assignor to Warner Electric Brake & Clutch Company, South Beloit, Ill., a corporation of Illinois Application June 30, 1953, Serial No. 365,213

1 Claim. (Cl. 29—155.59)

This invention relates to electromagnets, such as are used in brakes and clutches, and more particularly to annular electromagnets which are made in two parts. In magnets of this type, one part is formed by an energizing coil wound within a ring of U-shaped cross section telescoping with a pole piece unit which constitutes the other part. The pole piece unit comprises inner and outer concentric pole rings rigidly connected but magnetically separated by a nonmagnetic spacer. In the brake or clutch, the pole rings are bridged by an armature which, when the coil is energized, is drawn into frictional gripping engagement with the pole faces and nonmagnetic wear material pressed between the pole rings.

The general object of the invention is to make the pole piece unit by a novel method which is simpler and less expensive as compared to methods used heretofore, which insures a good mechanical connection between the spacer and the pole rings so that the spacer and the rings are joined rigidly together, and which does not require the use of special fixtures to join the rings to the spacer.

The principal object is to form the pole rings originally as a single piece and to join the spacer to the pole rings before cutting the piece to separate the rings.

A more detailed object is to form the spacer and join the latter to the pole rings by a single operation.

This invention also resides in the novel construction and arrangement of the pole piece unit and the spacer so as to reduce the cost of the materials required and hence the cost of the unit.

Other objects and advantages of the invention will become apparent from the following detailed description taken in connection with the accompanying drawings, in which—

Figure 1 is a longitudinal sectional view of the piece from which the pole rings are made in accordance with the present invention.

Figs. 2 and 3 are fragmentary sectional views similar to Fig. 1 showing the subsequent steps in the formation of the pole piece unit.

Fig. 4 is a fragmentary longitudinal sectional view of an electromagnetic clutch employing the novel pole piece unit.

In the drawings, the invention is shown embodied in an annular electromagnet 10 (Fig. 4) such as is used in an electromagnetic friction clutch or brake. Preferably, the magnet includes radially spaced inner and outer pole pieces 11 and 12 and an energizing coil 13 disposed between the pole pieces. The latter is formed by concentric rings which present axially facing pole faces 14 bridged by a rotatable armature 15. In the form shown, the armature is a flat ring of magnetic material and is supported for axial movement toward and away from the friction face 16 of the magnet by pins 17 which are mounted on a rotatable part 18.

For certain applications, it is desirable to form the magnet 10 in two parts by making the inner and outer pole pieces 11 and 12 as a separate unit 19. In some clutches, for example, it is preferred to use a stationary coil 13 while mounting the pole piece unit on a rotatable member 20 whereby the armature 15 constitutes one rotatable clutch element and the pole piece unit 19 forms the other. For this purpose, the coil 13 is secured within a stationary ring 21 which is made of magnetic material and is of U-shaped radial cross section with the legs of U telescoping within the pole rings 11 and 12. The pole rings and the magnet ring present two sets of opposed cylindrical surfaces 22, 23 and 24, 25 which are machined accurately to define two narrow annular gaps 26 and 27.

A nonmagnetic spacer 28 is disposed between the pole piece rings 11 and 12 and is joined to the rings to maintain the latter magnetically separated while connecting the two rigidly together to form the pole piece unit 19. To provide the friction face 16, an annulus 29 of nonmagnetic friction material is seated in an annular recess 30 in the front of the pole piece unit 19 so as to be disposed between the pole pieces 11 and 12 and flush with the pole faces 14.

With the foregoing arrangement, the armature 15 and the pole piece unit 19 are free to rotate independently when the coil 13 is deenergized. Upon energization of the coil, magnetic flux threads a substantially closed toroidal path shown in dotted outline in Fig. 4 and extending through the magnet ring 21, radially across the gap 26 between the surfaces 22 and 23, through the pole piece 12, the armature 15 and the pole piece 11, and back to the magnet ring across the gap 27 between the surfaces 24 and 25 as indicated by the broken line 31 in Fig. 4. As a result, the armature is drawn into gripping engagement with the friction face 16 so that the pole piece unit and the armature turn together.

In prior practice, the polepiece unit 19 was formed by making the pole rings 11 and 12 and the spacer 28 separately and then joining the three parts together. To overcome the difficulties encountered with this method, the present invention contemplates making the pole piece unit by a novel method which insures a good connection between the spacer and the pole rings and which, at the same time, simplifies the manufacture of the unit and reduces the over-all cost. This is achieved by forming the pole rings originally as a single unitary piece 32 (Fig. 1) and joining these rings and the nonmagnetic spacer 28 before separating the pole rings so as to eliminate the need for special fixtures and tools. Preferably, the manufacture of the composite annulus is simplified further by forming the spacer 28 concurrently with the joining of the latter to the pole rings thus performing the two operations as a single step.

Generally stated, the novel method comprises the steps of forming the pole ring piece 32 as a single ring of magnetic material with an annular recess 33 in one side, inserting the nonmagnetic spacer 28 in the recess and connecting the spacer to the ring 32 by fusing at opposite sides of the recess to form intermolecular bonds at the junctions of the sides and the spacer, and then removing the metal from the other side of the ring 32 to cut through to the bottom of the recess around the entire circumference thereof. In this way, the pole rings 11 and 12, which originally were integral, are separated and are held together only by the spacer 28. Thus the pole rings remain rigidly connected but are magnetically separated. Preferably, the piece 32 which forms the pole rings is an annular shell of U-shaped radial cross section as shown in Fig. 1 in which case the legs 34 of the U become the pole rings and the space between the legs and behind the crosspiece 35 may constitute the annular recess 33 receiving the spacer 28. If desired, the U-shaped shell may be made easily and inexpensively by being stamped from a flat sheet metal annulus.

While the nonmagnetic spacer 28 may be made in a plurality of parts and may be welded in place in the recess 33, it is preferred to form the spacer as a unitary ring and to braze this ring to the legs 34. Herein, advantage is taken of the U-shape of the shell 32 to form the spacer and braze the latter to the legs 34 in a single operation. To this end, the U-shaped shell is placed on its side with the recess 33 opening up and the latter is partially filled with molten copper. Such filling may be achieved by placing solid copper pieces in the recess and by melting the copper so that it is distributed evenly around the bottom of the recess. In this way, the shell 32 serves as a mold for the spacer 28 and, at the same time, the copper upon solidifying is bonded to the legs of the shell so that the spacer is connected rigidly to the legs which finally become the pole rings 11 and 12. The molding step may, as is customary in copper brazing operations, be performed in a heated furnace chamber filled with a nonoxidizing gas, such as a hydrogen gas, which makes the copper more fluid and promotes a better bond between the spacer and the pole rings. Although performed in a furnace, the molding and joining step is rather simple as compared to prior practices since it is not necessary to use a special fixture and, further, the two operations are performed simultaneously.

After the copper spacer 28 has been molded in the recess 33, the outside of the crosspiece 35 of the U-shaped shell 32 is machined to cut through to the bottom of the recess. This cut extends entirely around the shell so as to separate the legs or pole rings 11 and 12 completely. Preferably, the cut is made as an incident to the cutting of the recess 30 which receives the friction ring 29, that is, the recess 30 is made deep enough to extend through the crosspiece 35 as shown in Fig. 3. The recess may be cut on a suitable milling machine and the composite annulus may be machined further to form the pole faces 14 and the cylindrical surfaces 23 and 24 thus producing the shape shown in full in Fig. 3.

In accordance with another aspect of the invention, the spacer 28 is constructed in a novel manner to reduce the cost of manufacturing the pole piece unit 19 even further. For this purpose, the amount of nonmagnetic material required for the spacer is reduced by making the spacer partly of a cheaper material such as iron. This is achieved by disposing an annular insert 36 of iron between the pole rings 11 and 12 but spaced radially from both rings and by connecting the insert at its inner and outer peripheries to nonmagnetic pieces 37 and 38 (Fig. 3) which, in turn, are joined to the inner and outer pole rings respectively. In other words, the spacer 28 is a composite ring composed of the insert ring 36 and the nonmagnetic pieces 37 and 38. Thus, even though the insert is made of a magnetic material, the nonmagnetic pieces magnetically separate the pole rings from the insert and hence from each other.

Preferably, the insert 36 is made from the same U-shaped shell 32 from which the pole rings 11 and 12 are formed. To this end, the shell is constructed with two radially spaced annular grooves or recesses 39 (Fig. 1) in back of the crosspiece 35 and the nonmagnetic pieces 37 and 38, which may be copper rings, are inserted in these grooves and joined to the shell 32 on the opposite sides of the grooves. With this arrangement, the recess 30 for the friction material 29 is cut through to the bottoms of the grooves 39 as shown in Fig. 3, leaving the center portion 40 of the crosspiece 35 separate from the pole rings to constitute the insert 36.

In the present instance, the grooves 39 are made by deforming the crosspiece 35, that is, by bending the center portion 40 of the crosspiece back in between the legs 34 of the U-shaped shell 32. The crosspiece may be bent by a stamping operation which preferably is performed at the same time that the shell itself is stamped. As illustrated in Fig. 1, such bending leaves narrow annular recesses between the center portion 40 of the crosspiece and the legs 34 of the U-shaped shell 32 and these recesses constitute the grooves 39. After the shell is shaped, the grooves are filled with copper, as previously described, to form the nonmagnetic rings 37 and 38. Enough copper may be used to fill the shell above the crosspiece 35 so that the two rings 37 and 38 are joined together as shown in Fig. 2.

It will be observed that the foregoing method of making the pole piece unit 19 is simple and inexpensive as compared to prior methods. With the pole rings 11 and 12 formed originally as a unitary shell 32, the nonmagnetic material forming the spacer 28 may be secured in place easily and without the use of fixtures or other special tools. By molding the copper in the shell, the nonmagnetic spacer is formed and joined to the pole rings in the same operation. The pole piece unit is even cheaper when the insert 36 is used since the amount of copper required is reduced materially.

I claim as my invention:

The method of making a magnetic friction element, said method comprising the steps of forming an annulus of magnetic material with a first annular recess in one side thereof, inserting nonmagnetic material in said recess and fusing the same to said annulus on opposite sides of the recess to form intermolecular bonds at the junctions of said sides and said nonmagnetic material, cutting a second annular recess in the opposite side of said annulus and extending said second recess through to the bottom of said first recess to divide the annulus into two separate rings joined together and held in fixed relation by said nonmagnetic material and said bonds whereby said rings constitute axially projecting magnetically separated pole pieces, and inserting nonmagnetic friction material in said second recess to substantially fill the later between the projecting ends of said pole pieces.

References Cited in the file of this patent

UNITED STATES PATENTS

| | | |
|---|---|---|
| 1,297,271 | Stevens | Mar. 11, 1919 |
| 2,346,555 | Cobb | Apr. 11, 1944 |
| 2,451,500 | Le Greid | Oct. 19, 1948 |
| 2,476,151 | Le Jeune | July 12, 1949 |
| 2,482,860 | Miller | Sept. 27, 1949 |
| 2,597,476 | Goldman | May 20, 1952 |
| 2,729,318 | Harter | Jan. 3, 1956 |